(No Model.)
J. H. RUDY & T. WEAVER.
CREAMER.
No. 262,127. Patented Aug. 1, 1882.
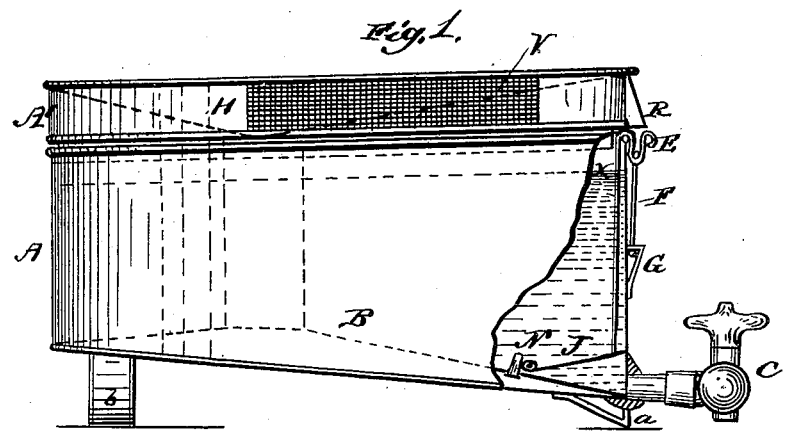
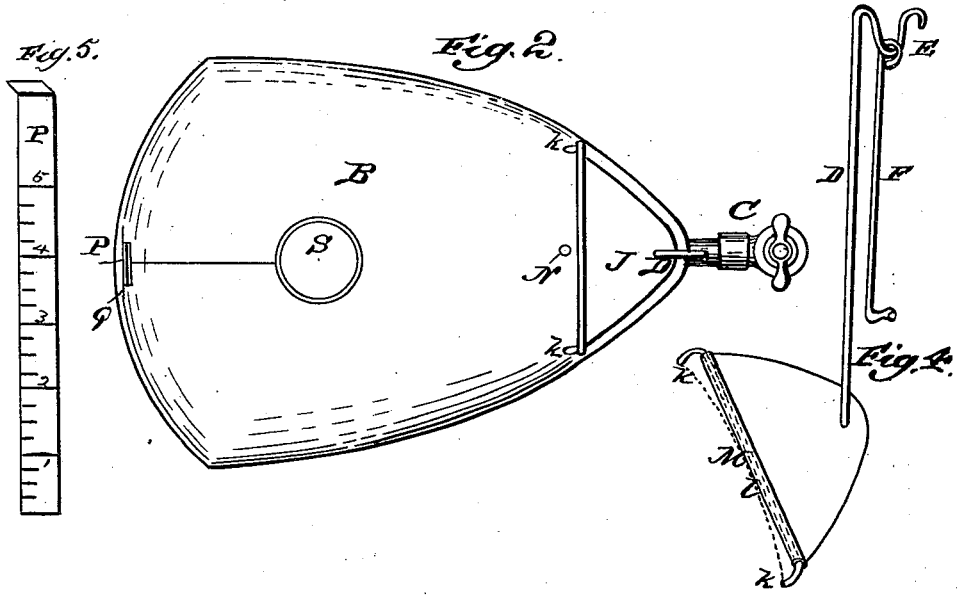
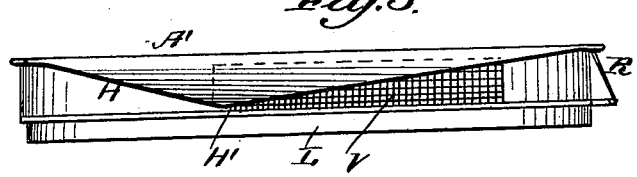
WITNESSES
Emory H. Bates,
R. S. Sellington
INVENTORS
John H. Rudy
Theophilus Weaver.
per Theophilus Weaver
ATTORNEY.

UNITED STATES PATENT OFFICE.

JOHN H. RUDY AND THEOPHILUS WEAVER, OF HARRISBURG, PA., SAID WEAVER ASSIGNOR TO SAID RUDY.

CREAMER.

SPECIFICATION forming part of Letters Patent No. 262,127, dated August 1, 1882.

Application filed April 13, 1882. (No model.)

*To all whom it may concern:*

Be it known that we, JOHN H. RUDY and THEOPHILUS WEAVER, both citizens of the United States, residing at Harrisburg, in the county of Dauphin and State of Pennsylvania, have invented new and useful Improvements in Creamers, of which the following is a specification.

Our invention relates to that class of milk-coolers which are adapted to withdraw the milk from under the cream, it being specially constructed to favor speedy cooling of the milk as well as purifying the same from animal odors and condensed vapor.

The principal novel features of our apparatus are, first, a peculiar locked shield or check-plate arranged over the exit or outlet to the spigot, to distribute the draft thereat, and thus draw evenly on the body of milk; second, the can-lid roof-sheet, dished conically to a point centrally over said stand-pipe, that the drops of condensed vapor collected on its under side may run to the said point and drip into the stand-pipe, thus operating to sweeten and purify the cream.

In the accompanying drawings, Figure 1 represents a side elevation of our can, a part at its peaked end being broken away to show the check device therein. Fig. 2 represents a top view of our can with the lid removed therefrom. Fig. 3 represents our can-lid. Fig. 4 represents a perspective view of our locked check device detached. Fig. 5 represents a gage for measuring the contents of the can.

In the following description similar letters refer to similar parts throughout all the views.

Referring to the drawings, A denotes the can, and A' the lid therefor. These parts are made peaked at the forward end, where the ordinary spigot, C, is located, and they are made wide about the stand-pipe S. The bottom of the can (denoted by letter B) is upheaved at said pipe S, and inclined in all directions therefrom to shed the milk forward to the spigot C, and also to expose the bulk of the contents to the effects of radiation at the can-wall, the central part of the can being thus of less depth. The can is set by feet $a\ b$, so as to have a forward pitch toward the spigot.

The can-lid A' is provided at its sides with the ventilators V, made of gauze or perforated sheet-tin. Said lid also has on it the guard R, to enter it more readily on the can, its peaked end being entered first. The principal novel feature of the lid is its dished top H H, which on its under side slopes from all sides to a focal point directly above the stand-pipe S. It is so made that drops or condensed vapor, by seeking the lowest point thereon, will be delivered by gravity into the stand-pipe S. Said stand-pipe is adapted to let air into the can atop the milk, and to procure it low down or near the ground, where it is coolest—that is, when the apparatus is set on the ground in cellars. It is, however, also adapted, when set in water, as in spring-houses, in lieu of crocks, to convey the temperature of the water centrally to the bulk of the milk, and by its upper open end to cool also the air in the upper part of the can.

The shield or check-plate J is to regulate the flow to the spigot C. Said plate is caught at its forward edge by a fixed stud, N, on the can-bottom B. Its oval forward end is held slanted against the oval wall of the can by a stem, D, which is hooked over the can-top, and held thereon by a hooked link, F, which connects it to a staple G, as shown. The plate is therefore locked to its place. It is so held that its stem D may not be displaced when the cream is parted from the can-wall, the film being usually severed before tapping the milk. The stem D is also a handle, that the shield device may be removed without soiling the hands, it being preferred to remove the fixture when pouring out the cream and in cleaning the can.

The front edge of the shield J terminates in the studs K K, which step on the can-bottom next the wall thereof. The middle of said front edge rests on the convexed or curved part of the bottom, as shown at the dotted line in Fig. 4. Thus two narrow inlets, $l\ l$, are formed, compelling the draft to act inward from the spigot and on the bottom of the can, and thus producing even flow of the issuing milk. The gang P is inserted by hasps Q on the can-wall.

What we desire to secure by Letters Patent of the United States is—

1. The shield or check-plate J, made with studs K, to step on the bottom B of can A, next its wall, and held at its middle on the convex rise of said bottom by the fixed stud N thereon, in combination with the stem D, link F, and staple G, or their equivalents, for locking the same to place, substantially as set forth.

2. The close-fitting can-lid A', having its top plate, H, dished downward centrally or sloped on its under side toward a focal dropping-point to run off drops from condensation of vapor arising from the milk, in combination with the can having central pipe, S, arranged directly underneath said point to convey said condensations thereby out of the can, as and for the purpose set forth.

In testimony that we claim the above as our invention we have hereunto set our hands and affixed our seals this 11th day of April, A. D. 1882.

JOHN H. RUDY. [L. S.]
THEOPHILUS WEAVER. [L. S.]

In presence of—
PETER STUCKER,
CHARLIE STUCKER.